D. H. WILSON.
ELECTRIC BATTERY.
APPLICATION FILED OCT. 23, 1914.
1,276,604.
Patented Aug. 20, 1918.
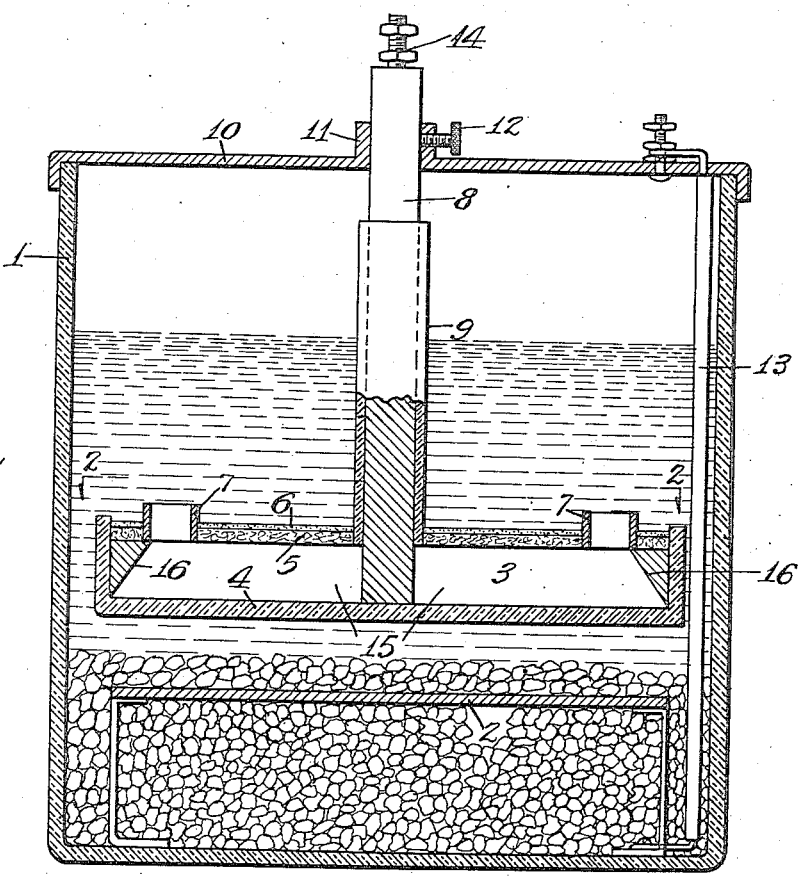
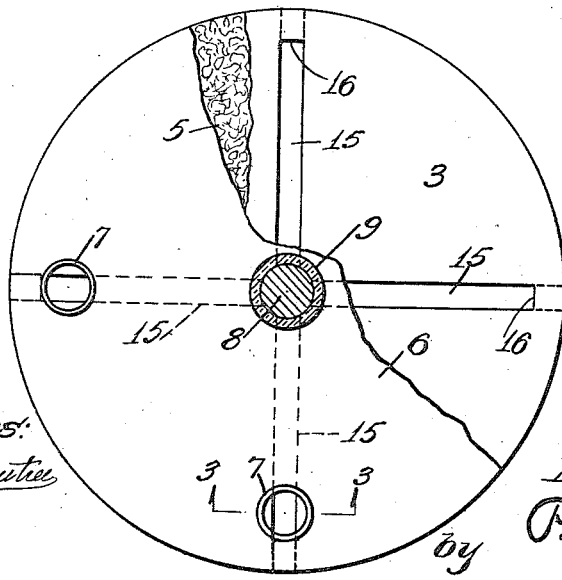
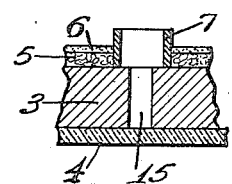
Inventor.
David H. Wilson.

UNITED STATES PATENT OFFICE.

DAVID H. WILSON, OF NEW YORK, N. Y.

ELECTRIC BATTERY.

1,276,604.  Specification of Letters Patent.  Patented Aug. 20, 1918.

Application filed October 23, 1914. Serial No. 868,238.

*To all whom it may concern:*

Be it known that I, DAVID H. WILSON, a citizen of the United States, residing at New York, in the county of New York and State of New York, have invented a certain new and useful Improvement in Electric Batteries, of which the following is a specification.

This invention relates to electric batteries, and has for its object to provide a new and improved battery of this description. This invention has among other objects to produce a gravity battery which shall have a long life and great reliability and cleanliness, with economy in the consumption of zinc, and which cannot be short-circuited by the dropping of the zinc, and by means of which a large current may be produced. The invention is illustrated in the accompanying drawings, wherein, Figure 1 is a view showing one form of battery embodying the invention, Fig. 2 is a sectional view taken on line 2—2 of Fig. 1.

Fig. 3 is a sectional view taken on line 3—3 of Fig. 2.

Like numerals refer to like parts throughout the several figures.

As illustrated in the drawing, I have shown a suitable jar 1, in which the battery solution is placed. In this jar are placed the electrodes 2 and 3. Electrode 2 is a copper electrode and is bent so that it can be located at any required distance from the bottom of the jar. The electrode 2 is immersed in a solution of sulfate of copper. The electrode 3 is contained in a shallow porous cup 4. This zinc electrode is provided with a series of slots 15 which extend through the material thereof, preferably from a point near the center to the outer rim 16. These slots permit the gases which are formed between the bottom of the zinc electrode and the inner face of the cup 4, to escape. On the top of this zinc electrode is placed a layer 5, of felt or other suitable material, and on top of this felt is placed a quantity of insulating battery wax 6, which fills in the porous cup and holds it rigidly in place in its proper relation to the zinc electrode. The tubing 7, projects up through the wax so as to allow the escape of gas which will form inside the porous cup, and which passes up into the slots 15. The rim 16 is preferably beveled on the underside to allow the bubbles of gas to fall off and come to the surface.

The shank 8, of the zinc electrode is provided with a tube 9, to protect it from the action of the battery solution. The battery jar is provided with a suitable cover 10, and the zinc electrode is adjustably connected with said cover. As herein shown, the cover is provided with a collar 11, having a set screw 12 which projects therethrough and engages the shank 8.

It will be seen that by loosening this set screw the zinc electrode may be moved toward or away from the copper electrode, so as to vary the amperage of the battery. This construction with the porous cup permits the broad surface of the zinc electrode to be brought much nearer the broad surface of the copper electrode when a large amperage is desired than could otherwise be done.

The conductor 13 is connected with the copper electrode and is provided with a suitable terminal for connecting it in the circuit. The zinc electrode is also provided with a suitable terminal 14, for connecting it in the circuit.

By bending the copper electrode as described the copper electrode can be used with jars of different depths as it will be raised a considerable distance from the bottom of the jar thereby permitting the electrodes to be brought a proper distance apart even when jars of various depths are used.

The porous cup moves with the zinc electrode and hence it prevents the two electrodes from being short-circuited in the event the zinc electrode drops upon the copper electrode, or in the event the electrodes are brought too close together.

I claim:

1. An electric battery comprising a jar, a copper electrode having bent portions by means of which it is supported at a distance above the bottom of the jar, a porous cup in said jar, and a zinc electrode in said porous cup, the porous cup supported by the zinc electrode.

2. An electric battery comprising a jar, two horizontally disposed electrodes in said jar, said electrodes adjustable relatively so that the distance between them may be varied and a horizontally disposed insulating device between the electrodes and adapted to prevent the electrodes from being brought together so as to be short circuited when moved relatively toward each other.

3. An electric battery comprising a jar, a copper electrode therein having a broad surface, a porous cup above said copper electrode, a zinc electrode in said porous cup, a covering material above said zinc electrode which protects its upper surface, a shank connected with said zinc electrode and an adjustable holding device for holding said shank in position, whereby the distance between the porous cup and the copper electrode may be varied.

4. An electric battery comprising a jar, a copper electrode in said jar, a zinc electrode in said jar, a porous cup in which said zinc electrode is received and which is interposed between the zinc electrode and the copper electrode, a covering material in the said porous cup above said zinc electrode, and means for permitting gas to escape from the cup through said covering material.

5. An electric battery comprising a jar, a copper electrode in said jar, a zinc electrode in said jar, a porous cup in which said zinc electrode is received and which is interposed between the zinc electrode and the copper electrode, a covering material in the said porous cup above said zinc electrode, and means for permitting gas to escape from the cup through said sealing device, a covering material connecting the zinc electrode and cup together, a shank for the zinc electrode by means of which it is supported and the protecting tube surrounding said shank.

6. An electric battery comprising a jar, a copper electrode in said jar, a zinc electrode in said jar, said zinc electrode provided with a series of slots passing therethrough, a shallow jar in which said zinc electrode is received, the bottom of said jar opposed to said copper electrode, a layer of felt on the top of said zinc electrode, insulating wax covering said felt, and opening through said felt and wax for the escape of gas from said slots.

7. An electric battery comprising a jar, two electrodes in said jar, one of said electrodes adjustable so that the distance between the electrodes may be varied to vary the current, and means connected with said adjustable electrode and movable therewith for preventing the short-circuiting of the electrodes when moved together.

In testimony whereof, I affix my signature in the presence of two witnesses this 21st day of October, 1914.

DAVID H. WILSON.

Witnesses:
CORA M. WILSON,
F. W. SEYBOLT.